(No Model.)

W. L. WRIGHT.
COMBINED POT AND PROTECTOR FOR SEEDLINGS, &c.

No. 404,585. Patented June 4, 1889.

Witnesses:
Chas. B. Shumway
Wm. de Mauriac

Inventor
Wilbur L. Wright
By George D. Seymour
Atty.

UNITED STATES PATENT OFFICE.

WILBUR L. WRIGHT, OF BRISTOL, CONNECTICUT, ASSIGNOR OF ONE-HALF TO SIGOURNEY BROS., OF SAME PLACE.

COMBINED POT AND PROTECTOR FOR SEEDLINGS, &c.

SPECIFICATION forming part of Letters Patent No. 404,585, dated June 4, 1889.

Application filed February 11, 1889. Serial No. 299,390. (No model.)

*To all whom it may concern:*

Be it known that I, WILBUR L. WRIGHT, residing at Bristol, in the county of Hartford and State of Connecticut, have invented certain new and useful Improvements in a Combined Pot and Protector for Seedling and other Plants; and I do declare the following to be a full, clear, and exact description of the same, reference being had to the accompanying drawings, which form a part of this specification.

My invention relates to an improved combined paper pot and protector for seedling or other plants, the object being to provide a substitute for the earthenware pots now in use, which shall not only be cheaper and more convenient than they are, but also be adapted to protect the plant after it has been set out in the earth.

With these ends in view my invention consists in a pot made of paper and having its bottom folded, so that when it is unfolded the pot may be drawn up over and away from the roots and around the stem and leaves of the plant.

Figure 1:
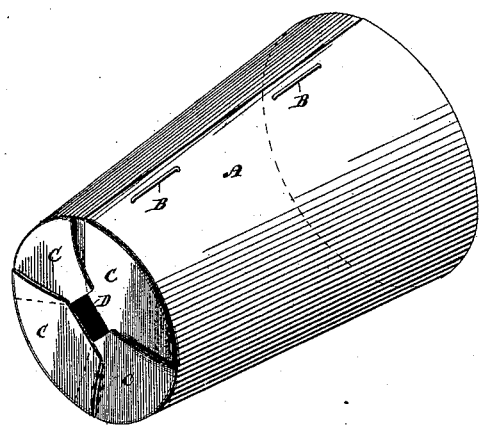
Figure 2:
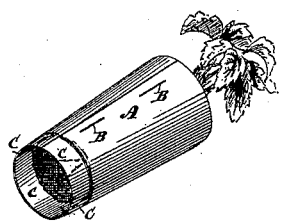
Figure 3:
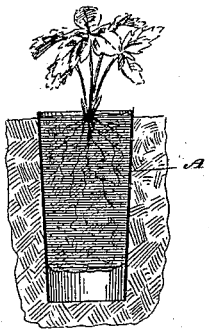
Figure 4:
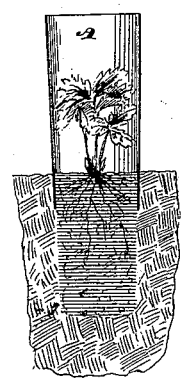

In the accompanying drawings, Figure 1 is a view in perspective of a pot made in accordance with my invention. Fig. 2 is a similar view, reduced in size, showing the unfolding of the lower end of the pot preparatory to setting out the plant. Fig. 3 is a view showing the pot and plant as they are first put into the earth; and Fig. 4 is a view showing the pot after it has been drawn up away from the roots of the plant, so as to form a protection for the stem and leaves thereof.

As herein shown, the pot or package A is nearly cylindrical in form, being made slightly smaller at its bottom than at its top to permit it to be stacked or telescoped with other similar pots for convenience in handling and transportation; but the general shape of the pot may be varied without departing from my invention. The pot is formed of tar or other water-proof paper of sufficient weight to retain its folded or manufactured shape. The edges of the paper are caught and held together by light wire staples B, which may be replaced by any other suitable form of fastening. The bottom of the pot is formed in four folds C, which are set in place by pinching them where they are folded or otherwise. Their inner ends fall a little short of meeting and form a central opening D for the escape of water from the pot. I would have it understood, however, that I do not limit myself to this particular way of folding the bottoms of the pots.

The little plants from the seed or from cuttings are transferred to or started in these pots in the usual way, and after they have got a good start are marketed. The purchaser preparatory to setting one of these potted plants into the earth pulls out or unfolds the folded bottom of the pot, and, if necessary, the staple nearest the bottom of the pot, and then drops the pot and the plant contained in it into the earth, as shown by Fig. 3 of the drawings. After this he gently pulls the pot up over and away from the roots of the plant and around the stem thereof, as shown by Fig. 4 of the drawings, and leaves it there to protect the plant from the weather, cut-worms, and insects.

My improved pots are so cheap that after being once used they may be thrown away, whereas the earthenware pots now employed must be used over and over again. My improved pots may be compactly put up for transportation, involve no loss for breakage, are in every way as convenient and efficient as the earthen pots, and have the advantage over them of being adapted to protect and foster the plants after they have been set out.

Having fully described my invention, what I claim as new, and desire to secure by Letters Patent, is—

As a new article of manufacture, a combined pot and protector for seedling and other plants, made of paper and having a folded bottom, the folds whereof are adapted to be pulled out when the plant is set out, so as to permit the pot to be pulled up over and away from the roots of the plant and form a protector for the stem and leaves thereof.

In testimony whereof I have signed this specification in the presence of two subscribing witnesses.

WILBUR L. WRIGHT.

Witnesses:
   EDSON M. PECK,
   MILES LEWIS PECK.